United States Patent [19]

Roberts et al.

[11] Patent Number: 5,005,294

[45] Date of Patent: Apr. 9, 1991

[54] SKIMMER/SEPARATOR LADLE

[76] Inventors: Leo B. Roberts; Emma F. Roberts, both of 1507 Cerulean, Creve Coeur, Mo. 63146

[21] Appl. No.: 443,185

[22] Filed: Nov. 30, 1989

Related U.S. Application Data

[63] Continuation-in-part of Ser. No. 538,336, Oct. 3, 1983, Pat. No. Des. 308,151.

[51] Int. Cl.5 .............................................. A47J 43/28
[52] U.S. Cl. ......................................... 30/324; 99/316
[58] Field of Search .................................. 30/324–328, 30/141, 149, 150; 99/316, 321, 499; 210/464, 466, 469; D7/47, 99, 104; 426/77, 79, 82

Primary Examiner—Douglas D. Watts
Attorney, Agent, or Firm—Polster, Polster and Lucchesi

[57] ABSTRACT

A skimmer/separator ladle has a handle, a bowl or spoon integral with the handle, the bowl having a lip at its upper edge forming a spout defining one end of the bowl, the rest of the bowl constituting a container section, and a separator gate removably mounted in the bowl between the spout and the container section. The gate has a concave bottom so as to define a liquid passage between it and the bottom of the ladle.

5 Claims, 3 Drawing Sheets

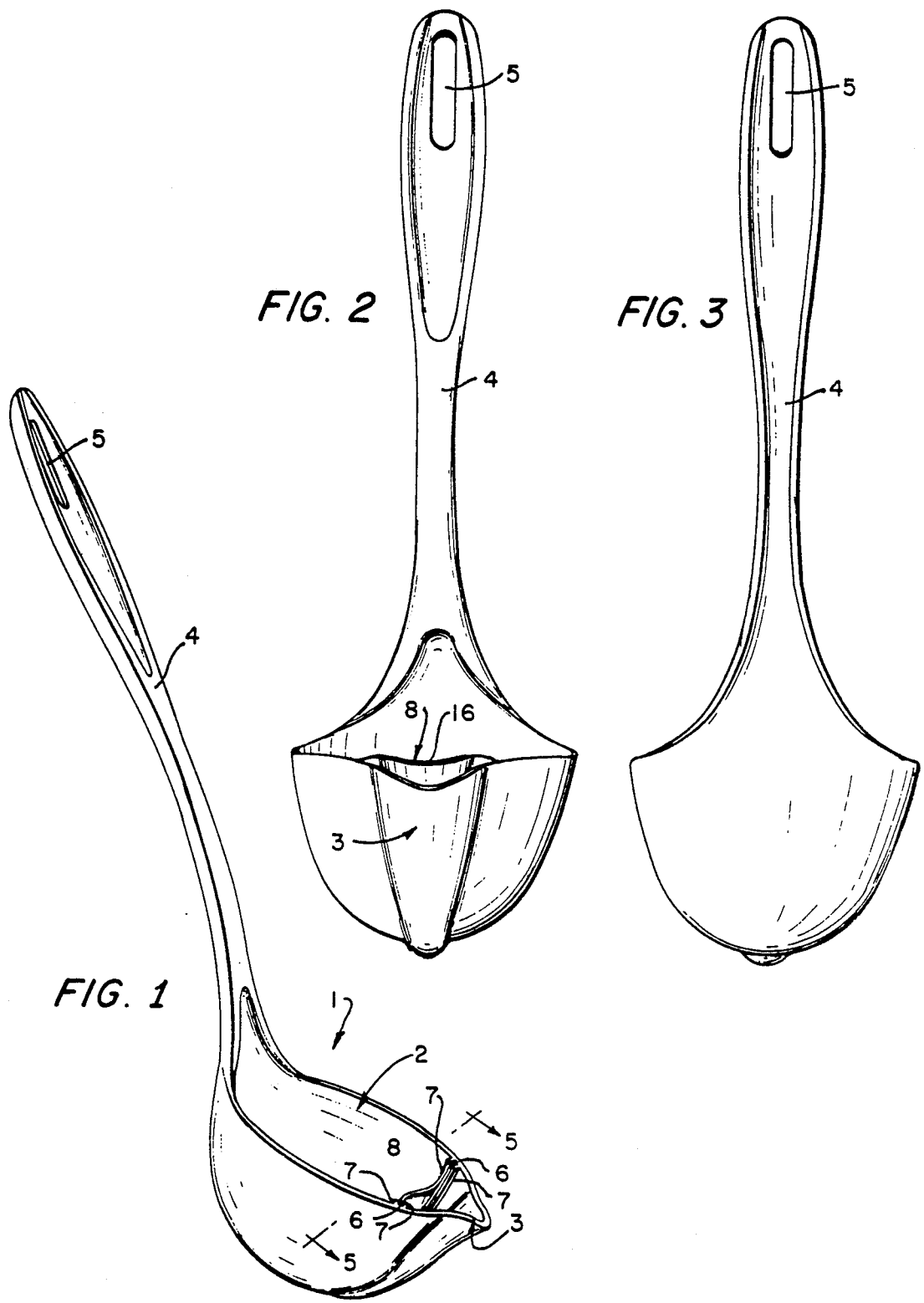

SKIMMER/SEPARATOR LADLE

RELATED APPLICATION

This is a continuation-in-part of co-pending application Ser. No. 538,336, filed Oct. 3, 1983, now U.S. Pat. No. Des. 308,151.

BACKGROUND OF THE INVENTION

Ladles with one or more spouts at the end or ends of a bowl, with a dam between the bowl and a spout to serve as a skimming device, are old in the art. However, the gate or dam has generally been made integral with the bowl, which makes cleaning of the meeting edges of the gate and bowl difficult, and precludes use of the ladle without the gate. Furthermore, the handle of such a device has generally been positioned at right angles to the spout axis, which has made the ladle in effect either right handed or left handed.

One of the objects of this invention is to provide a ladle with a removable gate for easy cleaning and to permit use of the ladle with or without the gate.

Another object is to provide such a ladle in which the handle is positioned parallel to the spout axis of the ladle, and is so formed as to be used with equal ease either left handedly or right handedly.

Other objects of this invention will be apparent to those skilled in the art in light of the following description and accompanying drawings.

SUMMARY OF THE INVENTION

In accordance with this invention, generally stated, a skimmer/separator ladle is provided that includes a handle, a bowl having a spout section at one end thereof and a container section at another end thereof, a separator gate removably mounted in the bowl between the spout and the container section, and coupling means for removably mounting the gate on the bowl. The gate defines a passage with the bottom of the bowl through which liquids to be decanted pass from the container section to the spout section. The coupling means includes tracks in which the gate is received, each track being semi-circular, the gate including semi-circular sides that mate with each of the semi-circular tracks. In the preferred embodiment, the handle is integral with the bowl, is elongated, and extends away from the bowl on a center line parallel to a spout axis. When the bowl is substantially circular, except for the protrusion of the spout, the center line of the spout is diametrically opposite the center line of the handle. Also, in the preferred embodiment, the handle is provided with a finger hook at its outer end, by which the ladle can be suspended over a finger, to permit ready manipulation of the ladle with either hand.

BRIEF DESCRIPTION OF THE DRAWINGS

In the drawings, FIG. 1 is a view in perspective of one embodiment of skimmer/separator ladle of this invention;

FIG. 2 is a view in front elevation;

FIG. 3 is a view in rear elevation;

DESCRIPTION OF THE PREFERRED EMBODIMENT

Figure 4:
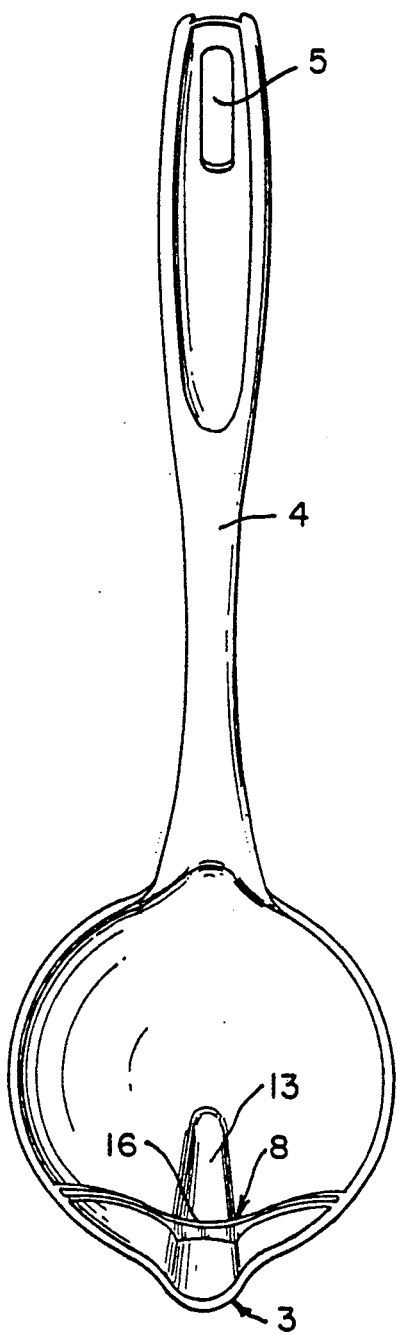
FIG. 4 is a top plan view.
Figure 5:
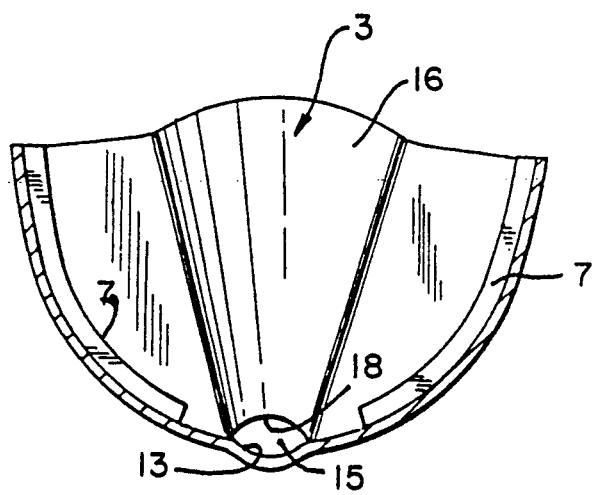
FIG. 5 is a sectional view taken along the line 5—5 of FIG. 1.

Referring now to the FIGS. 1 through 6 for one embodiment of skimmer/separator ladle of this invention, reference numeral 1 indicates the assembled ladle, which has a bowl 2 with a spout 3 defining one end and a handle 4 defining an end directly opposite the spout end of the bowl 2. In this embodiment, the handle is symmetrical about a center handle line, and the spout, about a spout axis or plane, the two axes being, in this embodiment, aligned, and therefore lying in a coincident plane.

Within the bowl 2, oppositely disposed semi-circular tracks or channels 6, defined by inwardly extending, laterally spaced ribs 7, extend from an upper edge of the bowl to points near its bottom, adjacent the spout. A separator gate or dam 8, sides or outer edges of which are shaped semi-circularly complementarily to the tracks 6, is removably but closely mounted in the tracks or channels 6. The ribs 7 and the bottom surface of the bowl constitute coupling means for removably mounting the gate in the bowl. The gate defines a spout section of the bowl at one end and a container section at the other.

In this embodiment, the bowl bottom wall has a shallow sump 13 that communicates with a lower end of the spout 3. The gate 8 has a concave bridging part 18 that is arched sufficiently to provide an opening even if the inner surface of the bottom of the bowl were uninterrupted by the sump 13, but which, with the sump, provides an even larger opening 15. The gate 8 also, in this embodiment, has an inverted truncated conical section 16, shown particularly in FIG. 5, which, at the upper edge, gives the gate 8 a butterfly appearance, as shown in FIG. 4. If the gate is made of a thin, somewhat resilient material, such as a suitable plastic, the section 16 provides a certain springiness, which helps to prevent accidental dislodgment of the gate.

The handle 4 has a hole 5 in it.

In use, the fact that the handle and the spout are aligned on diametrically opposite sides of the bowl permits the use of the ladle equally well with either hand. If it is desired to skim fat from a soup or gravy, for example, the gate 8 is pushed into the channel 6 between the ribs 7, being frictionally engaged therein. The ladle is filled with the material to be skimmed, and the fat permitted to rise to the top. The heavier liquid can then be separated from the supernatant fat or oil by tilting the ladle toward the spout, the heavier liquid running through the opening 15 and out the spout, while the supernatant oil remains blocked by the gate above the opening. If the ladle is to be used in the manner of an ordinary ladle, the gate is simply removed by pulling it straight out of the channel. It can be seen that the gate itself, and the channel and ribs 5 can easily be cleaned with a small brush, or even with a dish rag or the like.

Figure 6:
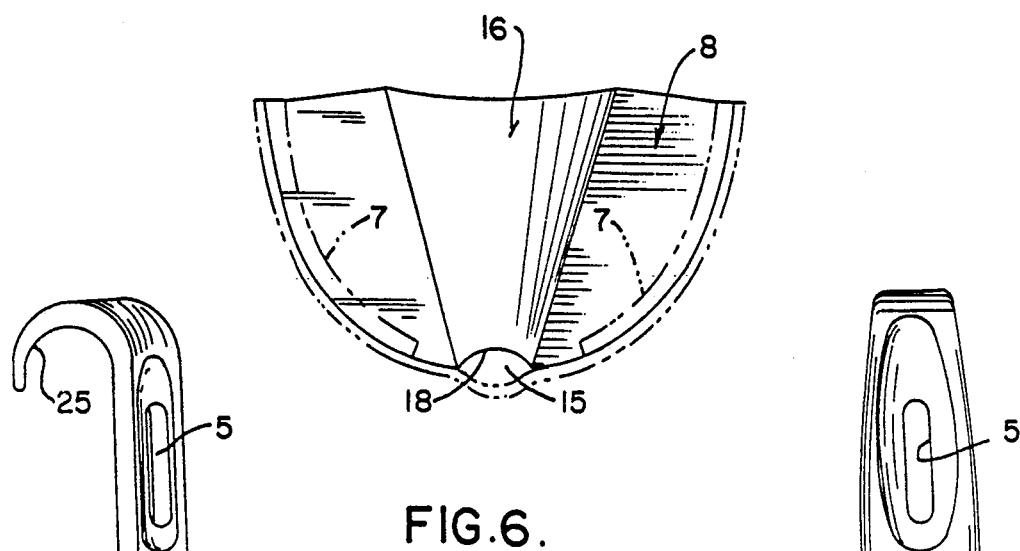
FIG. 6 is a view in rear elevation of the gate of the ladles shown in FIGS. 1-8, viewed in the direction indicated by line 6—6 of FIG. 7, but with the track shown in phantom lines.
Figures 7, 8:
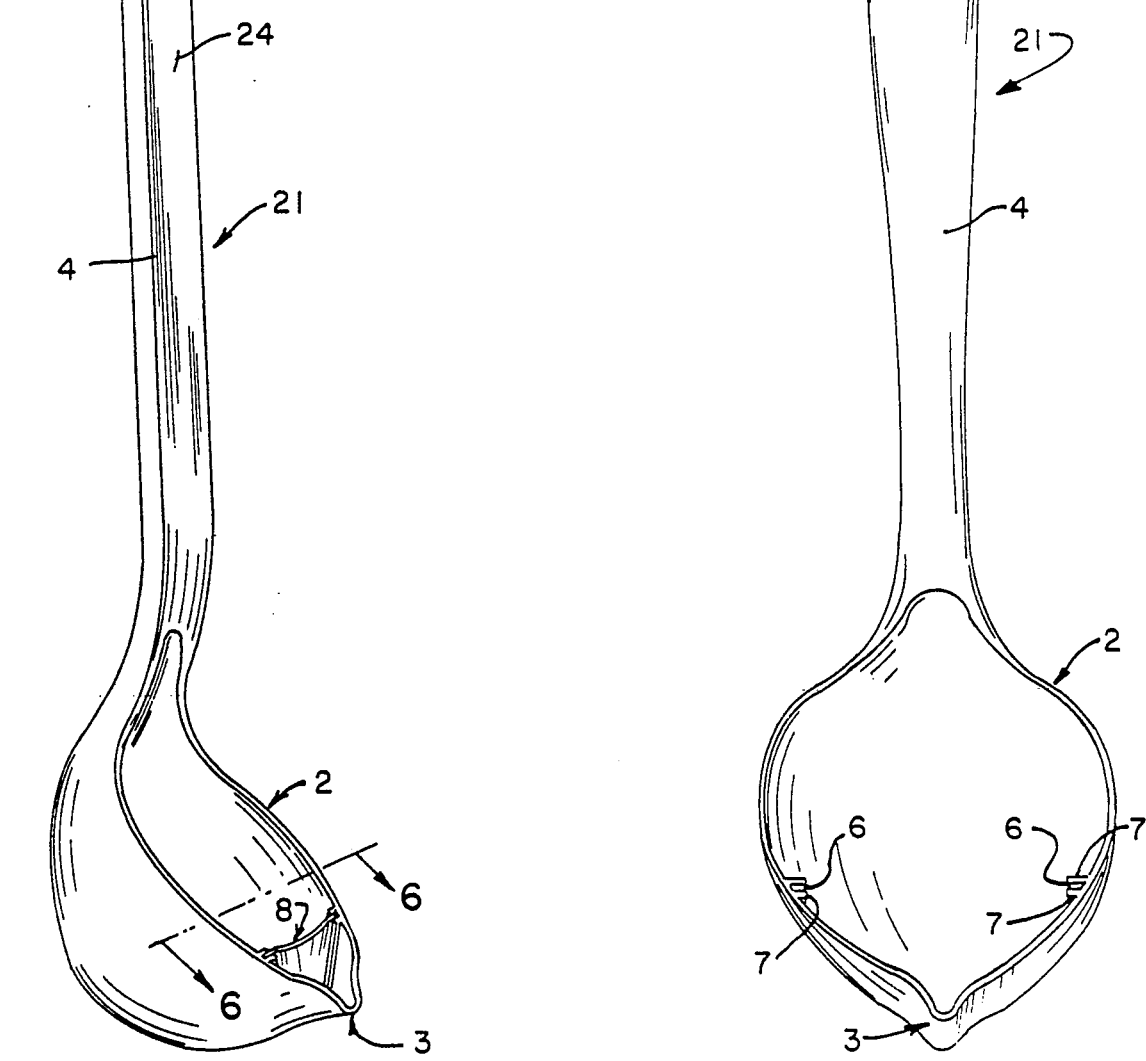
FIG. 7 is a view in perspective of another embodiment of ladle of this invention.
FIG. 8 is a view in front elevation of the ladle of FIG. 7 with the gate removed.

Referring now to FIGS. 7 and 8 for a second, and preferred embodiment of ladle 21, the gate, bowl and tracks can be identical to those of the embodiment shown in FIGS. 1 through 6, and, in fact, the gate shown in FIG. 6 is shown as installed in the ladle of FIG. 7.

The salient distinguishing feature of the ladle 21 shown in FIGS. 7 and 8 is the provision on a handle 24 of a finger hook 25, integral with the handle 24 at its free end. The hook 25 extends in a direction away from the open side of the bowl 2. The provision of the hook 25 and the spout at the diametrically opposite side of the bowl from the handle permits the ladle to be suspended from the edge of a finger of either hand, facilitating the use of the ladle in either hand.

Numerous variations in the construction of the ladle of this invention, within the scope of the appended claims, will occur to those skilled in the art in light of the foregoing disclosure. Merely by way of example, the spout and gate arrangement can be put at locations around the bowl different from the one shown in the drawings and described, locating the spout at ninety degrees from the long axis of the handle, for example, but that, in large measure, destroys the "either-handedness" of the ladle. The bowl can be elongated, preferably in the direction of the spout axis, or otherwise configured, as by a strake pattern in a gravy boat. Other configurations of the gate, or means for removably mounting the gate can be provided. For example, the conical section of the gate can be flattened, and the gate can be held securely in the channels by putting a slight wave in the edges of the gate to provide more frictional engagement of the gate with the ribs defining the channels, or one rib can be provided on each side and the bowl configured on the spout side to wedge the gate against it. The handle can vary in shape, size relative to the ladle, and configuration, as by being curved along its length, or even curved forward with respect to the bowl, with the finger hook tending forward, for example. These are merely illustrative.

We claim:

1. In a skimmer/separator ladle comprising:
   a handle;
   a bowl having a spout section at one end thereof and a container section at the other end thereof, the improvement consisting of: a separator gate removably mounted in said bowl between said spout and said container section and means for removably mounting said gate on said bowl, said gate defining a passage with the bottom of said bowl for liquids from the container section to said spout section, said mounting means comprising at least one track in said bowl in which said gate is received, said at least one track being semicircular, the gate including semicircular sides that mate with said semi-circular track.

2. The ladle of said claim 1 wherein said handle has a hole in the upper end thereof.

3. The ladle of claim 1 including a separate downwardly curved intermediate section connecting said bowl with said handle.

4. The ladle of claim 1 wherein the same is generally ovoid-shaped.

5. A skimmer/separator ladle comprising a bowl, a handle extending from and defining one end of said bowl, said handle being elongated and having at a free end thereof a finger hook, a gate removably mounted inside said bowl adjacent said spout, said gate having a bridge section at a lower edge thereof, defining an opening with an inner surface of said bowl, and at least one rib on either side inside said bowl adjacent said spout defining tracks or channels to receive said gate, side edges of said gate being shaped complementarily to the bowl within said channels.

* * * * *